United States Patent [19]
Cavil

[11] 3,723,844
[45] Mar. 27, 1973

[54] BI-DIRECTIONAL VOLTAGE CONTROL FOR PERMANENT MAGNET ALTERNATOR

[75] Inventor: David T. Cavil, Menomonee Falls, Wis.

[73] Assignee: Outboard Marine Corporation, Waukegan, Ill.

[22] Filed: Mar. 29, 1971

[21] Appl. No.: 128,816

[52] U.S. Cl. ..........................320/59, 320/71, 322/91
[51] Int. Cl.................................................H02j 7/14
[58] Field of Search ....320/9, 39, 61, 71, 59; 322/28, 322/91; 323/22 SC, 24; 317/33; 220/DIG. 2

[56] References Cited

UNITED STATES PATENTS

| 3,402,325 | 9/1968 | Minks | 320/39 X |
| 3,588,523 | 6/1971 | Grafton | 323/24 X |
| 3,436,639 | 4/1969 | Burkett et al | 320/39 X |

OTHER PUBLICATIONS

GE SCR Manual 4th Edition, Page 459, "Diode AC Switch (DIAC, Breakover Voltage Symmetry"

Primary Examiner—J. D. Miller
Assistant Examiner—Robert J. Hickey
Attorney—Robert E. Clemency, John W. Michael, Gerrit D. Foster, Bayard H. Michael, Paul R. Puerner, Joseph A. Gemignani, Andrew O. Riteris, Robert K. Gerling and Spencer B. Michael

[57] ABSTRACT

Disclosed herein is a battery charging circuit comprising solid state means electrically connected across an alternating voltage generating means, including a triac and bi-directional breakdown means connected to the gate of the triac, and operable, in the event of generation of voltage above a predetermined level, for limiting voltage output of the voltage generating means.

12 Claims, 5 Drawing Figures

Patented March 27, 1973    3,723,844

Inventor
David T. Cavil
By
Robert E. Clemency
Attorney

BI-DIRECTIONAL VOLTAGE CONTROL FOR PERMANENT MAGNET ALTERNATOR

BACKGROUND OF THE INVENTION

The invention relates generally to circuits for charging batteries and operating other electrical devices. More particularly, the invention relates to battery charging circuits including a permanent magnet alternator providing an alternating source of variable voltage. In such battery charging circuits, it is desirable to provide for preventing of over-charging of the battery, i.e., to regulate battery charging, and also, in the event of disconnection of the battery from the permanent magnet alternator, to provide for preventing the alternator from generating excessive voltage, i.e., to provide a voltage clipping action. Attempts have been made to accomplish the above goals magnetically and by using a multiplicity of unidirectional thyristors.

SUMMARY OF THE INVENTION

The invention provides a battery charging circuit including solid state bi-directional switching means, operable in response to the generation of a voltage of predetermined level, to shunt the voltage generating means and thereby, if the predetermined level is below the maximum desired battery charge, to prevent over-charging of the battery, and, if the predetermined level is above the maximum desired battery charge, to prevent excessive voltage generation in the event of disconnection of the battery from a voltage generating means, such as for instance, by a permanent magnet alternator.

More specifically, the invention provides a battery charging circuit affording full wave battery regulation, which circuit will also provide clipping action in the event of battery disconnection. If desired, both half-wave battery regulation and half-wave voltage clipping action can be provided in the same circuit. Under such circumstances, with the battery connected, regulated battery charging takes place during the generation of voltage of one polarity while battery charging in response to voltage generation of the other polarity is unregulated. In the event of battery disconnection, both polarities of generated voltage are clipped.

In accordance with the invention, voltage regulation or clipping is provided by a triac which is connected across the voltage generating means and which has a gate connected to a solid state two-way voltage breakdown device. Such a device can comprise a diac which will break down at approximately the same voltage level regardless of the applied polarity and which can be used, depending upon the breakdown voltage and the desired battery voltage, to provide full wave regulation and, upon battery disconnection, full wave clipping action, or in the event of battery disconnection (without battery regulation) to also provide full wave clipping action. The solid state breakdown device can also comprise back-to-back zener diodes which can be arranged to break down at one voltage level upon the application of voltage of one polarity and to break down at another level upon the application of the other polarity. As already indicated, if the breakdown voltage is below maximum desired battery charging voltage, battery regulation will be provided under normal operation and, in the event of battery disconnection, voltage clipping will occur. If the breakdown voltage is above maximum desired battery charging voltage, clipping action will occur in the event of battery disconnection. Thus, if one breakdown voltage is below maximum battery charging voltage and the other just above maximum battery charging voltage, one-half cycle of voltage regulation will occur and in the event of battery disconnection, full wave voltage clipping will occur, such clipping to be effective, during one-half wave, at the voltage breakdown level below maximum battery charging voltage and, during the other half wave, at the voltage breakdown level above maximum battery charging voltage. If desired, full wave battery regulation can be obtained at either the same or differing voltages.

A principal object of the invention is the provision of a battery charging circuit including a battery-charging-voltage-generating means and solid state switch means for limiting voltage generation thereof.

Another of the principal objects of the invention is the use, in a battery charging circuit, of a triac to obtain bi-direction voltage generation control by connection of the triac gate to a bi-directional solid state breakdown device, such as for instance, a diac or back-to-back zener diodes.

Another of the principal objects of the invention is the provision of a solid state controlled, battery charging system providing either or both of battery regulation and voltage clipping in the event of battery disconnection.

Another of the principal objects of the invention is the provision of a solid-state controlled, battery charging circuit which will provide battery regulation or voltage clipping or both, which is economical to manufacture, and which will provide reliable service over a long and useful life.

Other objects and advantages of the invention will become known by reference to the following description and accompanying drawings.

DRAWINGS

GENERAL DESCRIPTION

Figure 1:
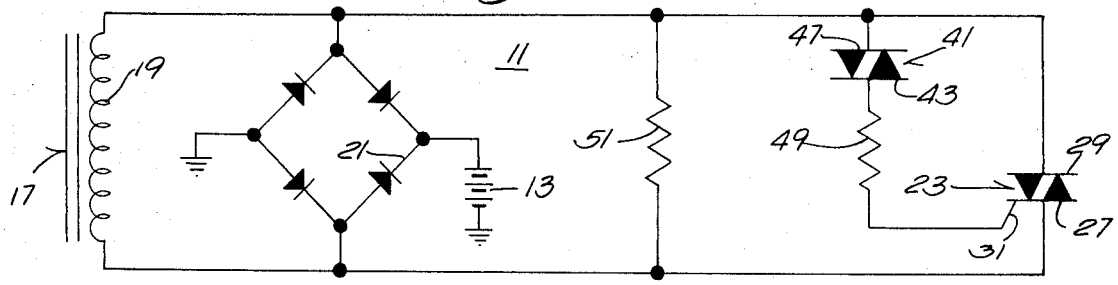
FIG. 1 is a wiring diagram of one embodiment of a battery charging circuit including various of the features of the invention.

Shown in FIG. 1 is a circuit 11 for charging a battery 13 or otherwise applying voltage to an electrical device, which circuit 11 includes means, such as a permanent magnet alternator 17, for generating and alternating or reversing voltage, and solid state means electrically connected across said voltage generating means, and operable in the event of voltage generation by the alternator 17 above a predetermined level, for limiting the output voltage from the voltage generating means. As used herein, the term "limiting" refers to preventing any further increase in voltage and includes reduction of the voltage generated. In the embodiments to be disclosed hereinafter, the structure is operative to reduce the voltage generated to a value close to zero.

More specifically, the circuit 11 comprises a permanent magnet alternator winding 19 which is electrically connected to means for rectifying the alternating voltage output from the winding 19, which rectifying means can take various forms and, in the disclosed construction, is in the form of a grounded full wave rectifying bridge 21. The rectifying means is connected to the positive terminal of the battery 13 for charging of the battery.

The output voltage limiting means or solid state switch means comprises connection across the alternator winding 21 of a triac 23 including a first anode 27, a second anode 29, and a gate or control terminal 31. The triac 23 is of the type which is operative, when the first anode 27 is more positive with respect to the second anode 29 and the gate 31 is more negative than the first anode 27, to turn on or conduct current and which is operative, when the second anode 29 is positive with respect to the first anode 27 and the gate 31 is more positive than the first anode 27, to turn on or conduct current. After the gate 31 is turned on, and current is flowing, the triac 23 will continue to conduct and the current must be reduced to near zero before the triac will recover and return to its current blocking condition. Under normal battery charging operating conditions, the triac does not otherwise conduct, although such triacs can, under some other circumstances, become conducting.

The gate 31 of the triac 23 is connected to a diac 41 which includes a first anode 43 and a second anode 47 and which breaks down or conducts current upon the application of a predetermined voltage. After breaking down, current flow through the diac 41 must be reduced to near zero before the diac will recover its blocking capability. In addition, after breakdown, the voltage drop across the diac 41 is much less than the breakdown voltage. The diac can also be referred to as a bi-directional trigger diode. If the predetermined voltage level is below maximum battery charging voltage, battery regulation will occur under normal operation and, in the event of battery disconnection, full wave voltage clipping will occur. If the predetermined voltage is above the maximum battery charging voltage, regulation will not be provided although voltage clipping will occur in the event of battery disconnection.

Connected in series between the diac 41 and the gate 31 of the triac 23 is a resistor 49 which serves to limit the current flowing through the diac 41 and the gate 31.

Also connected across the ends of the alternator winding 19 in parallel with the full wave bridge rectifier 21 is a resistor 51 which shunts the alternator winding 19 to suppress transient voltage occurring during recovery of the blocking ability of the triac 23.

Exemplary values for the components employed in the circuit 11 are as follows:

| Component | Value |
|---|---|
| Triac 23 | 15 amps, 200 volts |
| Diac 41 | Breakdown voltage: 24 to 32 volts |
| Resistor 49 | 270 ohms, ½ watt |
| Resistor 51 | 330 ohms, 2 watts |

In operation, and with the second anode 29 initially positive relative to the first anode 27, in the event of battery disconnection from the alternator winding 19, the triac 23 initially blocks current flow of one polarity, thereby causing increase in the voltage applied to the diac 41. When the voltage applied to the diac 41 reaches the breakdown voltage (24 to 32 volts in the specifically disclosed construction and 52 in FIG. 2) the diac 41 breaks down, and the gate 31 of the triac 23 becomes positive relative to the first anode 27. Thus, current passing through the diac 41 to the gate 31 of the triac 23 causes the triac 23 to be conducting. When the triac 23 conducts, current flow through the triac 23 limits or prevents the further build-up or increase in the voltage generated by the alternator winding 19 and, in fact, causes the voltage level to drop to near zero as shown at 53 in FIG. 2.

Figure 2:
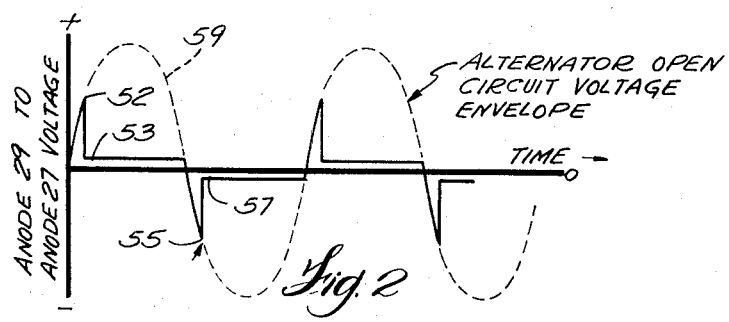
FIG. 2 is a voltage diagram illustrating the operation of the circuit shown in FIG. 2.

In FIG. 2 (and in FIG. 5) the vertical axis represents the relative condition of the second anode 29 to the first anode. Thus, above the midpoint, the second anode 29 is more positive than the first anode 27, and below the midline, the second anode 29 is negative or less positive than the first anode 27.

The triac 23 will remain conducting until the polarity of the voltage is reversed and the current through the triac 23 accordingly is returned to zero, whereby the triac again recovers its blocking ability.

When the voltage polarity is reversed, the first anode 27 becomes more positive than the second anode 29. At the same time, the triac 23 will again block current flow and, as a consequence, the voltage applied through the gate 31 and through the resistor 49 to the diac 41 will increase until the diac breakdown voltage is reached. At such voltage (See 55 in FIG. 2), the diac 41 breaks down and the gate 31 of the triac 23 then becomes more negative with respect to the first anode 27, whereby the triac 23 again becomes conductive, and thereby again limiting voltage increase and, in fact, reducing generated voltage by the alternator winding to an output of near zero (See 57 in FIG. 2).

Referring to FIG. 2, it will be apparent that the dotted line 59 represents the voltage which could otherwise occur in the absence of the voltage limiting arrangement of the invention.

In operation of the circuit 11, when the battery 13 remains connected to the rectifying bridge 21, the voltage generated by the alternator 17 will be limited by the battery voltage (assuming such voltage is under 24 volts). However, should the battery 13 become disconnected from the rectifying bridge 21, full wave clipping action will occur as shown in FIG. 2.

Figure 3:
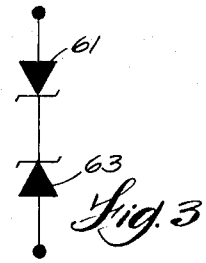
FIG. 3 is illustrative of a modified portion of the circuit shown in FIG. 1.

The circuit shown in FIG. 1 can be modified by employing first and second back-to-back zener diodes 61 and 63, as shown in FIG. 3, in place of the diac 41. In addition, a double anode clipper could also be used instead of the diac 41 to obtain symmetrical triac triggering.

Figure 4:
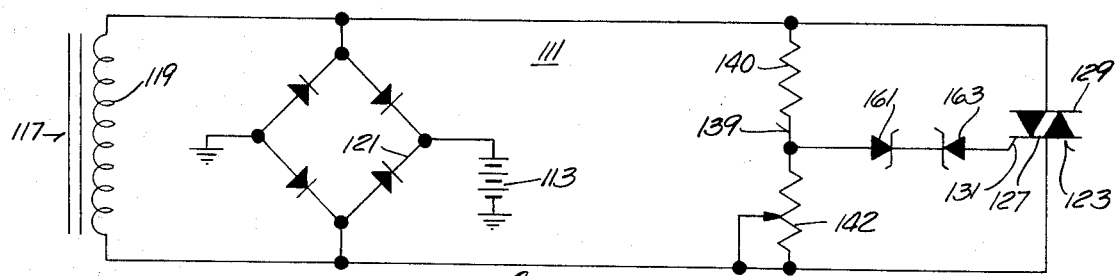
FIG. 4 is a wiring diagram showing another battery charging circuit embodying various of the features of the invention.

Shown in FIG. 4 is another circuit 111 embodying various of the features of the invention and including means operable, during normal operation and during the generation of voltage of one polarity, for preventing charging of a battery 113 when the battery charge reaches a predetermined level and operable, during generation of the other voltage polarity and in the event of disconnection of the battery 113 from the voltage generating means, for reducing or limiting the magnitude of the voltage generated by the voltage generating means. More specifically, the circuit 111 comprises means for generating alternating voltage, such as a permanent magnet alternator 117 including a winding 119 electrically connected to means for rectifying the alternating voltage. Such rectifying means can take various forms and, in the disclosed construction, is in the form of a full wave rectifying bridge 121. In turn, the rectifying bridge 121 is connected to the positive terminal of the battery 113 for charging thereof in response to the generation of voltage by the permanent magnet alternator 117.

The means operable, during the generation of voltage of one polarity, for preventing battery charging after the battery charge reaches a predetermined level, and additionally operable for limiting the magnitude of voltage output during generation of the opposite voltage polarity and in the event of disconnection of the battery from the voltage generating means, comprises connection across the ends of the alternator winding 119 of a triac 123 which is of the same general type as the triac 23 and which includes a first anode 127, a second anode 129, and a gate or control terminal 131. Connected to the gate 131 of the triac 123 are series connected, back-to-back zener diodes 161 and 163 having different zener levels or breakdown voltages. In turn, the zener diodes 161 and 163 are connected to the middle of a voltage divider 139 connected to the ends of the alternator winding 119. The voltage divider 139 includes a resistor 140 which is connected to one end of the alternator winding 119 and a variable resistor 142 connected to the other end of the alternator winding 119. In practice, the variable resistor 142 is preset so that the voltage drop across the resistor 142 is equal to the sum of the zener voltage of the zener diode 163, the forward voltage drop of the zener diode 161, and the voltage drop from the gate 131 to the anode 127 of the triac 123 at the battery voltage that regulation is desired.

Exemplary values for the components employed in the circuit 111 are as follows:

| Component | Value |
|---|---|
| Triac 123 | 15 amps, 200 volts |
| Zener diode 161 | Breakdown voltage: 9.1 volts, 1.0 watts |
| Zener diode 163 | Breakdown voltage: 6.8 volts, 1 watt |
| Resistor 140 | 82 ohms, 2 watts |
| Resistor 142 | 200 ohms, 5 watts |

Figure 5:
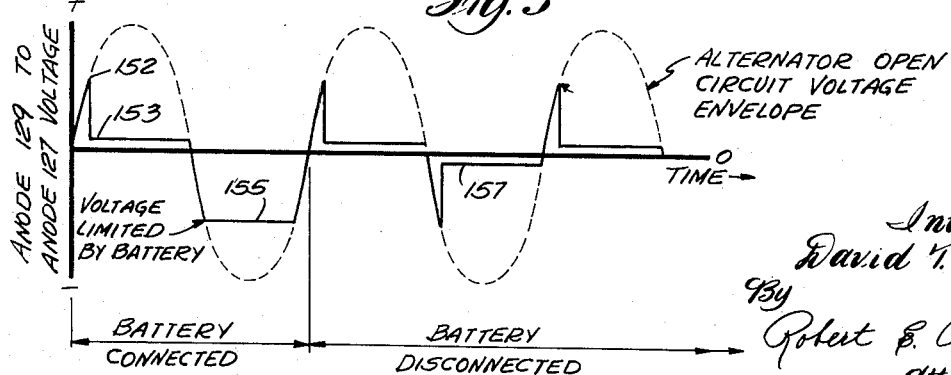
FIG. 5 is a voltage diagram illustrating the operation of the circuit shown in FIG. 4.

If for instance, one-half cycle battery voltage regulation is desired at 15 volts (see 152 in FIG. 5), the resistor 142 is set and the zener diodes 161 and 163 are selected such that when the battery voltage is approximately at 15 volts, the zener diode 163 will break down as previously explained so as to permit current flow through the gate 131 of the triac 123 and cause the triac 123 to conduct so as to shunt the alternator winding 119 and reduce the voltage output from the alternator winding 119 to a level near zero as shown at 153 of FIG. 5. In the event that the battery charging voltage is less than 15 volts, battery charging will take place during the generation of voltage of positive polarity.

During voltage generation of the other polarity (illustrated at the left side of the lower half of the diagram shown in FIG. 5), the voltage source will generate a voltage (shown at 155) which, in general, is determined by the charge condition of the battery. However, should the battery become disconnected for any reason, when the voltage generated by the permanent magnet alternator 117 reaches the breakdown voltage of the zener diode 161, the diode 161 will permit current flow through the gate 131 and will cause the triac 123 to be conducting, whereby to limit or discontinue voltage increase and, in fact, to decrease generated voltage to a level near zero, as shown at 157 at the right side of the lower half of FIG. 5.

The construction shown i5 FIG. 4 can be modified to provide two-stage regulation, i.e., to provide one level of regulation during the generation of a positive voltage and to provide a second level of regulation during the generation of negative voltage. Such two-stage regulation can be achieved by selecting zener diodes with breakdown values which are relatively close to one another and less than the maximum battery charging voltage. For instance, such zener diodes can be selected so that regulation during generation of positive voltage will occur at 14½ volts and so that the regulation will occur during generation of negative voltage at 15½ volts. In these circumstances, battery regulation and voltage clipping will occur during the generation of positive voltage whenever the charge on the battery exceeds 14½ volts. Such battery regulation and voltage clipping will also occur during the generation of voltage of negative polarity whenever the voltage on the battery is at or about 15½ volts, thereby preventing overcharging of the battery. As a consequence, voltages of both polarities are employed to charge the battery up to a level of 14½ volts. Thereafter as the battery voltage increases, the voltage generated with positive polarity will be clipped (as shown at the top of FIG. 5) and when the voltage of the battery approaches 15½ volts the negative voltage will also be clipped.

The arrangement shown in FIG. 1 could be modified by employing a voltage divider similar in construction to that shown in FIG. 4 to increase the range of usable diac voltages.

Various of the features of the invention are set forth in the following claims.

What is claimed is:

1. A battery charging circuit comprising means for generating alternate voltage, a rectifier electrically connected across said voltage generating means, a battery electrically connected to said voltage generator means through said rectifier for charging of said battery through said rectifier by said voltage generating means, a two-way solid state switch connected across said voltage generating means and including a control terminal, and a two-way solid state voltage breakdown means operably connected to said voltage generating means and to said control terminal of said solid state switch to cause, upon breakdown of said voltage breakdown means, conduction of said solid state switch, said breakdown means having a first voltage breakdown level above the maximum charging voltage for said battery and a second voltage breakdown level below said first voltage breakdown level.

2. A battery charging circuit in accordance with claim 1 wherein said voltage generating means comprises a permanent magnet alternator including a winding.

3. A battery charging circuit comprising a permanent magnet alternator including a winding, a rectifier electrically connected across said alternator, a battery electrically connected to said alternator through said rectifier for charging of said battery through said rectifier by said alternator, a triac having a gate and first and second anodes connected across said winding, a voltage divider connected across said winding and including two resistors, and first and second zener diodes connected back-to-back in series to said gate and to said voltage divider between said resistors, said first zener diode having a first voltage breakdown level below the maximum charging voltage for said battery, whereby to provide half-wave battery regulation and, in the event of battery disconnection from said alternator, to provide voltage clipping, and said second zener diode having a second voltage breakdown level above the maximum charging voltage for said battery, whereby in the event of battery disconnection from said alternator, to provide voltage clipping.

4. A battery charging device comprising means for generating alternate voltage, a rectifier electrically connected across said voltage generating means, a battery electrically connected to said voltage generator means through said rectifier for charging of said battery through said rectifier by said voltage generating means, a two-way solid state switch connected across said voltage generating means and including a control terminal, and a two-way solid state voltage breakdown means operably connected to said voltage generating means and to said control terminal of said solid state switch to cause, upon breakdown of said voltage breakdown means, conduction of said solid state switch, said two-way voltage breakdown means having a first voltage breakdown level below the maximum charging voltage for said battery and a second voltage breakdown level above said first voltage breakdown level.

5. A battery charging circuit in accordance with claim 1 wherein said voltage generating means includes a winding with opposite ends and wherein said switch comprises a triac having a gate and first and second anodes connected across said voltage generating means, and said voltage breakdown means comprises a diac including a first anode connected to one of said ends of said winding and a second anode connected to said gate.

6. A battery charging device in accordance with claim 5 including a resistor connected across said voltage generating means in parallel relation to said triac.

7. A battery charging circuit in accordance with claim 1 wherein said voltage generating means includes a winding with opposite ends and wherein said switch comprises a triac having a gate, and first and second anodes connected across said voltage generating means, and said voltage breakdown means comprises first and second zener diodes connected back-to-back in series to one of said ends of said winding and to said gate.

8. A battery charging device in accordance with claim 7 including a voltage divider connected across said voltage generating means and including two resistors and wherein said series connected back-to-back zener diodes are connected to said voltage divider between said resistors.

9. A battery charging circuit comprising means for generating alternate voltage, a rectifier electrically connected across said voltage generating means, a battery electrically connected to said voltage generator means through said rectifier for charging of said battery through said rectifier by said voltage generating means, a two-way solid state switch connected across said voltage generating means and including a control terminal, and a two-way solid state voltage breakdown means operably connected to said voltage generating means and to said control terminal of said solid state switch to cause, upon breakdown of said voltage breakdown means, conduction of said solid state switch, said breakdown means having a first voltage breakdown level below the maximum charging voltage for said battery, whereby to provide half-wave battery regulation and, in the event of battery disconnection from said voltage generating means to provide voltage clipping, and said breakdown means having a second voltage breakdown level above the maximum charging voltage for said battery, whereby in the event of battery disconnection from said voltage generating means, to provide voltage clipping.

10. A battery charging circuit in accordance with claim 9 wherein said voltage generating means comprises a permanent magnet alternator including a winding.

11. A battery charging circuit in accordance with claim 9 wherein said voltage generating means includes a winding with opposite ends and wherein said switch comprises a triac having a gate and first and second anodes connected across said voltage generating means, and said voltage breakdown means comprises a diac including a first anode connected to one of said ends of said winding and a second anode connected to said gate.

12. A battery charging circuit in accordance with claim 9 wherein said voltage generating means includes a winding with opposite ends and wherein said switch comprises a triac having a gate, and first and second anodes connected across said voltage generating means, and said voltage breakdown means comprises first and second zener diodes connected back-to-back in series to one of said ends of said winding and to said gate.

* * * * *